US011950126B2

(12) United States Patent
Nguyen et al.

(10) Patent No.: US 11,950,126 B2
(45) Date of Patent: *Apr. 2, 2024

(54) HALF DUPLEX TECHNIQUES FOR WIRELESS COMMUNICATIONS

(71) Applicant: QUALCOMM Incorporated, San Diego, CA (US)

(72) Inventors: Tien Viet Nguyen, Bridgewater, NJ (US); Shailesh Patil, San Diego, CA (US); Sudhir Kumar Baghel, Pleasanton, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,587

(22) Filed: Nov. 16, 2022

(65) Prior Publication Data

US 2023/0104364 A1  Apr. 6, 2023

Related U.S. Application Data

(63) Continuation of application No. 16/562,072, filed on Sep. 5, 2019, now Pat. No. 11,540,163.

(Continued)

(51) Int. Cl.
*H04W 28/02* (2009.01)
*H04L 5/16* (2006.01)
(Continued)

(52) U.S. Cl.
CPC .......... *H04W 28/0268* (2013.01); *H04L 5/16* (2013.01); *H04W 74/08* (2013.01); *H04W 74/0808* (2013.01); *H04W 92/18* (2013.01)

(58) Field of Classification Search
CPC ..... H04L 5/14; H04L 5/1423; H04L 25/0272; H04L 5/1461; H04L 5/16; H01L 2924/00;
(Continued)

(56) References Cited

U.S. PATENT DOCUMENTS 10,064,124 B2   8/2018  Lindoff et al.
2008/0310348 A1 12/2008 Nandagopalan et al.
(Continued)

FOREIGN PATENT DOCUMENTS

WO   2017221114 A1  12/2017
WO   2018032014 A1   2/2018
(Continued)

OTHER PUBLICATIONS

International Search Report and Written Opinion—PCT/US2019/050043—ISA/EPO—dated Nov. 15, 2019.
(Continued)

*Primary Examiner* — Hardikkumar D Patel
(74) *Attorney, Agent, or Firm* — ArentFox Schiff LLP

(57) ABSTRACT

Aspects described herein relate to receiving, over a sub-channel of multiple sub-channels, ultra-reliable quality-of-service (QoS) traffic from one or more UEs over a time duration wherein other sub-channels of the multiple sub-channels are used for initial ultra-reliable QoS transmissions from one or more other transmitting UEs over the time duration, and relaying, along with one or more other relaying UEs, the ultra-reliable QoS traffic over a subsequent time duration.

20 Claims, 9 Drawing Sheets

Related U.S. Application Data

(60) Provisional application No. 62/728,509, filed on Sep. 7, 2018.

(51) Int. Cl.
  *H04W 74/08* (2009.01)
  *H04W 74/0808* (2024.01)
  *H04W 92/18* (2009.01)

(58) Field of Classification Search
  CPC ............. H04W 28/0268; H04W 74/08; H04W 74/0808; H04W 92/18; H04W 40/34; H04W 74/0816; H04W 88/04; H04B 7/2606
  USPC ........................................................ 370/276
  See application file for complete search history.

(56) References Cited

U.S. PATENT DOCUMENTS

| | | |
|---|---|---|
| 2009/0047898 A1 | 2/2009 | Imamura et al. |
| 2012/0039242 A1 | 2/2012 | Alexiou |
| 2013/0070628 A1 | 3/2013 | Natarajan et al. |
| 2013/0136013 A1* | 5/2013 | Kneckt ............... H04W 72/541 370/252 |
| 2016/0309468 A1* | 10/2016 | Chen .................. H04W 72/0446 |
| 2017/0188391 A1 | 6/2017 | Rajagopal et al. |
| 2018/0152234 A1* | 5/2018 | Huang ............... H04B 7/15557 |
| 2018/0176747 A1 | 6/2018 | Li et al. |
| 2018/0255532 A1 | 9/2018 | Li et al. |
| 2019/0132784 A1* | 5/2019 | Thubert .............. H04W 72/044 |
| 2019/0280761 A1* | 9/2019 | Hu ...................... H04B 7/15557 |
| 2020/0084656 A1 | 3/2020 | Nguyen et al. |

FOREIGN PATENT DOCUMENTS

| | | |
|---|---|---|
| WO | WO-2018032014 A1 * | 2/2018 |
| WO | 2018095550 A1 | 5/2018 |

OTHER PUBLICATIONS

International Preliminary Report on Patentability—PCT/US2019/050043, The International Bureau of WIPO—Geneva, Switzerland, dated Mar. 18, 2021.

* cited by examiner

HALF DUPLEX TECHNIQUES FOR WIRELESS COMMUNICATIONS

CLAIM OF PRIORITY UNDER 35 U.S.C. § 119

The present application for patent is a continuation of application Ser. No. 16/562,072, entitled "HALF DUPLEX TECHNIQUES FOR WIRELESS COMMUNICATIONS" filed Sep. 5, 2019, which claims priority to Provisional Application No. 62/728,509, entitled "TECHNIQUES FOR REDUCING HALF DUPLEX IMPACT IN VEHICULAR WIRELESS COMMUNICATIONS" filed Sep. 7, 2018, which are assigned to the assignee hereof and hereby expressly incorporated by reference herein for all purposes.

BACKGROUND

Aspects of the present disclosure relate generally to wireless communication systems, and more particularly, to techniques for use in half-duplex communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In 5G URLLC, for example, in certain instances reliability of V2X communications may be impacted by half-duplex communications where a UE transmitting information on a resource may not be able to receive other transmissions on the resource. For example, where the transmission to the received is URLLC, the reliability requirement may not be achievable in this scenario.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes scheduling transmission of a first type of traffic, that is subject to listen-before-talk (LBT), over first frequency resources of a sidelink in a time duration, scheduling transmission of an ultra-reliable quality-of-service (QoS) traffic, that is not subject to LBT, over second frequency resources of the sidelink in the same time duration, transmitting the first type of traffic data over the first frequency resources of the sidelink in the scheduled time duration, and transmitting the ultra-reliable QoS traffic over the second frequency resources of the sidelink in the same scheduled time duration.

In another example, a method for wireless communication is provided. The method includes generating data for a first type of traffic for transmitting to a user equipment (UE) over a sidelink, determining whether one or more UEs are transmitting ultra-reliable QoS traffic over the sidelink in a time duration, and transmitting, based on determining that the one or more UEs are not transmitting ultra-reliable QoS traffic over the sidelink, the data for the first type of traffic to the UE over the sidelink in the same time duration.

In another example, a method for wireless communication is provided including generating data for ultra-reliable QoS traffic for transmitting to a UE over a sidelink, determining whether the one or more UEs are transmitting a first type of traffic data over the sidelink in a time duration, determining, based on determining that one or more UEs are transmitting a first type of traffic data over the sidelink in a time duration, whether one or more UEs indicate to receive ultra-reliable QoS traffic over the sidelink, and transmitting, based on determining that the one or more UEs are not transmitting the first type of traffic data over the sidelink, or the one or more UEs are transmitting the first type of traffic data over the sidelink but do not indicate to receive ultra-reliable QoS traffic over the sidelink, the data for the ultra-reliable QoS traffic over the sidelink in the time duration.

In another example, a method of wireless communication is provided that includes determining a group of relaying UEs, selecting a sub-channel of multiple sub-channels for transmitting, to the group of relaying UEs, ultra-reliable QoS traffic along with one or more other transmitting UEs in the same time duration, and transmitting the ultra-reliable QoS traffic to the group of relaying UEs in the same time duration over the sub-channel.

In yet another example, a method of wireless communication is provided that includes receiving, over a sub-channel of multiple sub-channels, ultra-reliable QoS traffic from one or more UEs in the same time duration, and relaying, along with one or more other relaying UEs, the ultra-reliable QoS traffic in a subsequent time duration.

In a further examples, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the transceiver and the memory. The one or more processors are configured to determine a group of relaying UEs, select a sub-channel of multiple sub-channels for transmitting, to the group of relaying UEs, ultra-reliable QoS traffic along with one or more other transmitting UEs in the time duration, and transmit the ultra-reliable QoS traffic to the group of relaying UEs in the same time duration over the sub-channel.

In another example, an apparatus of wireless communication is provided that includes means for determining a group of relaying UEs, means for selecting a sub-channel of multiple sub-channels for transmitting, to the group of relaying UEs, ultra-reliable QoS traffic along with one or more other transmitting UEs in the time duration, and means for transmitting the ultra-reliable QoS traffic to the group of relaying UEs in the same time duration over the sub-channel.

In yet another example, a non-transitory computer-readable medium is provided that includes code executable by one or more processors for wireless communications. The code includes code for determining a group of relaying UEs, selecting a sub-channel of multiple sub-channels for transmitting, to the group of relaying UEs, ultra-reliable QoS traffic along with one or more other transmitting UEs in the time duration; and transmitting the ultra-reliable QoS traffic to the group of relaying UEs in the same time duration over the sub-channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
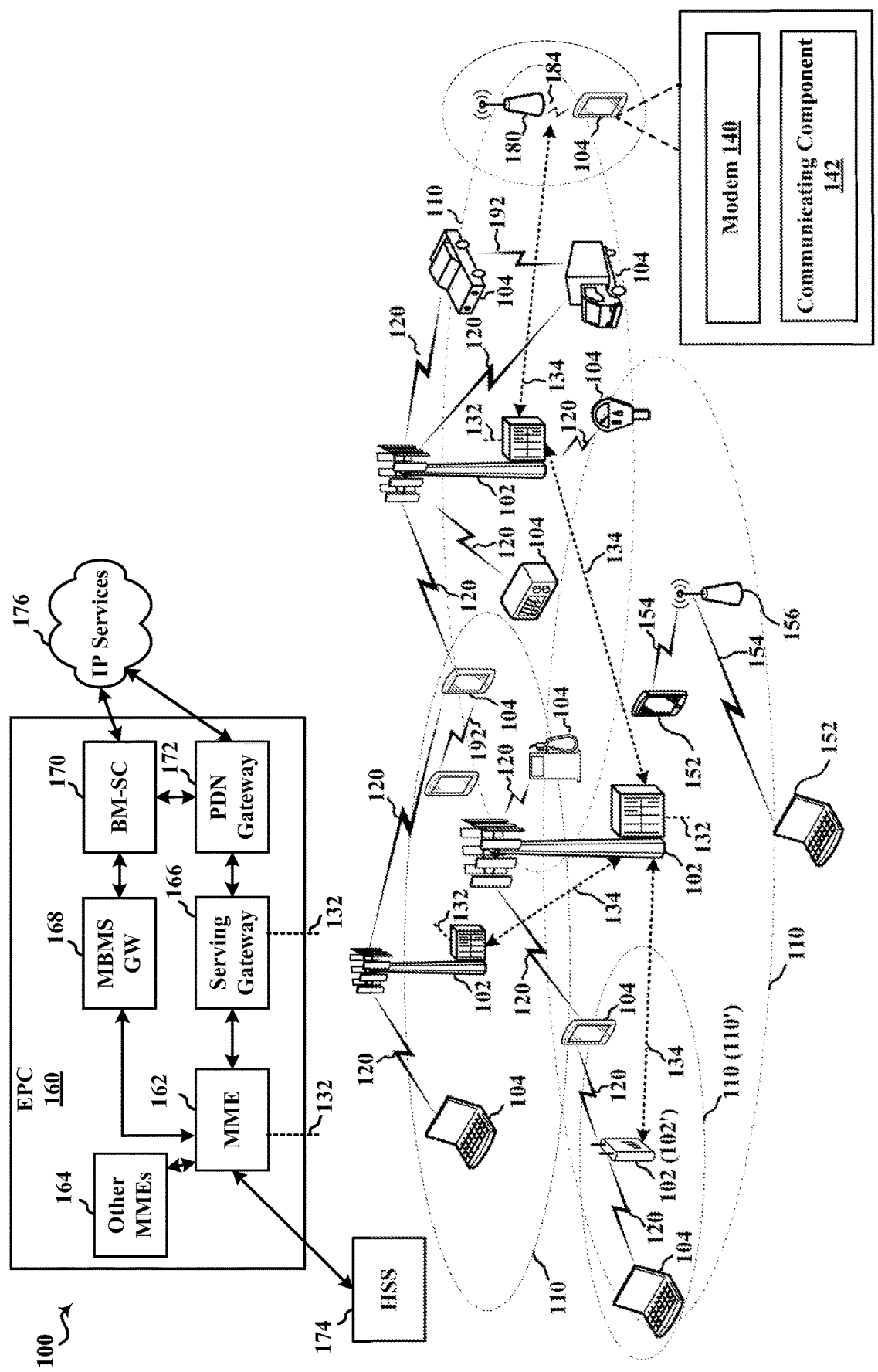
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to improving half-duplex communications for device-to-device (D2D) communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel. By the device-to-device nature, communications may be half-duplex and may constrain achievable latency. In particular, for example, when a device has information to transmit, and if there is another transmission in another resource block in the same division of time, then that device may not receive the other transmission. This half duplex constraint may be a bottleneck for ultra-reliable quality-of-service (QoS) traffic, also referred to herein as ultra-reliable-low latency communications (URLLC) traffic, due to reliability requirements associated therewith.

Accordingly, various aspects described herein relate to techniques for multiplexing and/or relaying V2X communications, which may, in certain instances, possibly improve reliability for half-duplex communications. For example, aspects described herein can facilitate half-duplex of ultra-reliable QoS traffic with transmission of normal (non-ultra-reliable QoS) traffic, half-duplex of ultra-reliable QoS traffic with ultra-reliable QoS traffic, and/or half-duplex of ultra-reliable QoS traffic with relaying data (e.g., where relaying can be employed for both normal traffic and ultra-reliable QoS traffic to increase range/reliability). For example, normal (non-ultra-reliable QoS) traffic may be subject to listen-before-talk (LBT) mechanisms where a device can listen on a channel to ensure the channel is clear before sending communications, while the ultra-reliable QoS traffic may not be subject to LBT. Moreover, for example, ultra-reliable QoS traffic can relate to autonomous driving and/or safety messages between vehicles in V2X communications, while the normal traffic can relate to informational data, such as mapping data, points of interest, vehicle details or statistics, and/or the like.

In one example, different types of traffic (e.g., ultra-reliable QoS and non-ultra-reliable QoS traffic) can be aggregated in a frequency division multiplexing (FDM) manner to facilitate concurrent transmission and/or reception of the traffic in a given time duration. In another example, time division multiplexing (TDM) can be used to transmit different types of traffic (e.g., ultra-reliable QoS and non-ultra-reliable QoS traffic), where a device can determine whether transmission of traffic is already occurring based on detecting at least a portion of a transmission or an indication that transmission of a certain type of traffic is desired before attempting to transmit over a given time duration (and may accordingly receive corresponding communications, backoff transmission during the given time duration, etc.).

In yet another example, traffic can be relayed to provide a virtual uplink and downlink separation. In this example, a device can transmit a request to send data to other devices, along with similar requests being made by the other devices (e.g., as the uplink). The devices can receive the requests and determine which device is to transmit (e.g., as the downlink) in a time duration. Priorities can be assigned to the devices, which may be based on a randomly selected sequence, and the device indicating the highest priority in the request can send data in the time duration. In this example, relay transmission can have higher priority than original transmissions, so original transmissions can yield to the relay transmissions.

In the above examples, half-duplex of D2D communications may benefit from prioritizing ultra-reliable QoS communications, whether by FDM the ultra-reliable QoS communications with normal communications, by TDM the ultra-reliable QoS communications to allow normal transmissions to yield to ultra-reliable QoS communications, or by relaying ultra-reliable QoS communications.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example of a wireless communication access network 100 includes at least one UE 104 with a modem 140 for communicating in a wireless network and a communicating component 142 for half-duplexing ultra-reliable QoS communications with other communications (e.g., other ultra-reliable QoS communications or non-ultra-reliable QoS communications) in a time division, relaying ultra-reliable QoS communications, etc., as described above and further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can also have a modem for communicating in the wireless network with the one or more UEs, as described further herein.

The one or more UEs 104 and/or the one or more base stations 102 may communicate with other UEs and/or other base stations via an Evolved Packet Core (EPC) 160 or a 5G core. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. In other examples, a 5G core may include other components or functions that may be accessible by the base station 102 over a backhaul link in a 5G wireless network, such as a Access and Mobility Management Function (AMF) a Session Management Function (SMF), a User Plane Function (UPF), a Unified Data Management (UDM), etc.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over sidelink 192) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving.

In aspects described herein, UE 104 can communicate with other UEs over sidelink 192, and can multiplex or relay the communications, which may be beneficial in half-duplex communications in V2X.

Turning now to FIGS. 2-9, aspects are depicted with reference to one or more components and one or more methods that may perform the actions or operations described herein, where aspects in dashed line may be optional. Although the operations described below in FIGS. 3-5, 7, and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
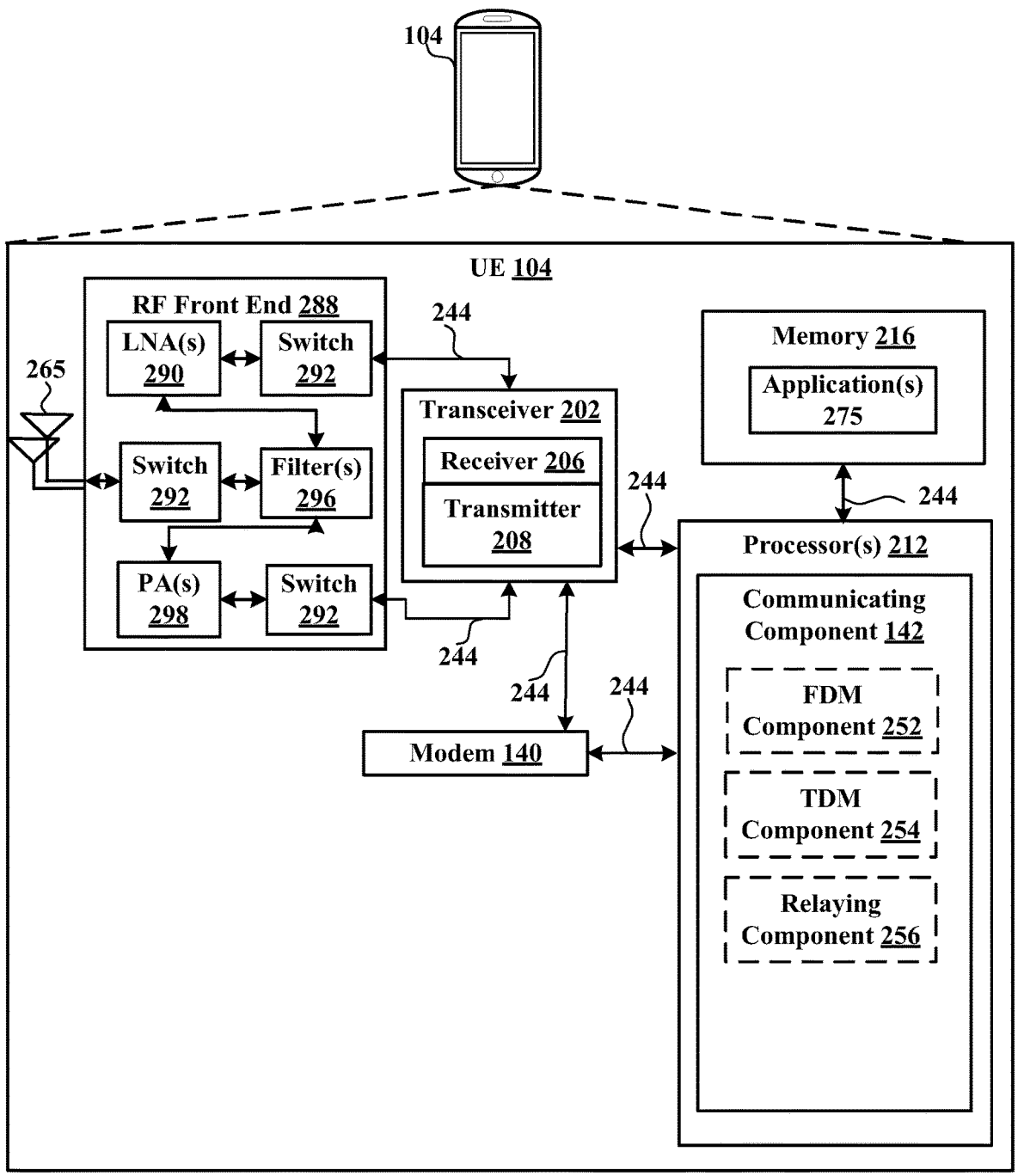
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or communicating component 142 to enable one or more of the functions described herein related to multiplexing and/or relaying V2X communications using half-duplex.

In an aspect, the one or more processors 212 can include a modem 140 and/or can be part of the modem 140 that uses one or more modem processors. Thus, the various functions related to communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 142 may be performed by transceiver 202.

Also, memory 216 may be configured to store data used herein and/or local versions of applications 275 or communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 142 and/or one or more of its subcomponents, and/or data associated therewith, when UE 104 is operating at least one processor 212 to execute communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 142 can optionally include a FDM component 252 for applying FDM to different types of communications for transmitting the communications to reduce packet reception loss that may otherwise be caused by half-duplex, a TDM component 254 for applying TDM to different types of communications based on detecting whether one type of communication is already transmitting in a time duration and accordingly refraining from scheduling another type of communication or not, and/or a relaying component 256 for relaying certain types of communications to effectuate virtual communication separation between devices on the sidelink.

In an aspect, the processor(s) 212 may correspond to one or more of the processors described in connection with the UE in FIG. 9. Similarly, the memory 216 may correspond to the memory described in connection with the UE in FIG. 9.

Figure 3:
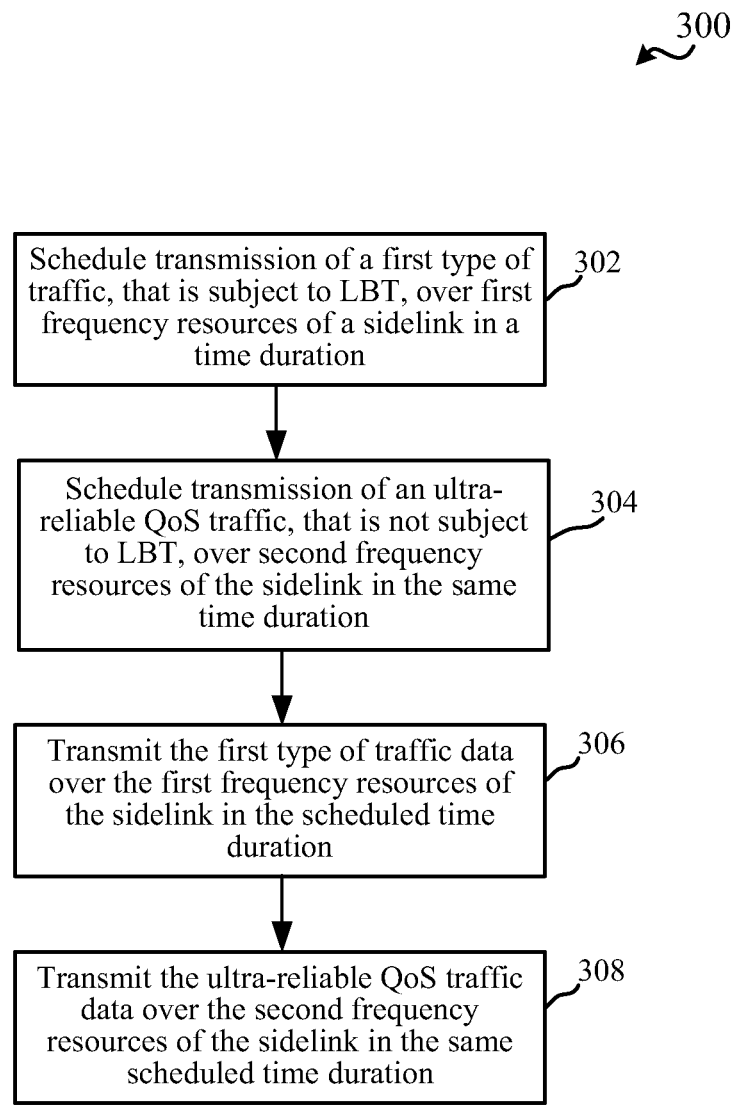
FIG. 3 is a flow chart illustrating an example of a method for frequency division multiplexing ultra-reliable quality-of-service (QoS) traffic with other traffic, in accordance with various aspects of the present disclosure.

FIG. 3 illustrates a flow chart of an example of a method 300 for applying FDM to different types of traffic in wireless communications. In an example, a UE 104 can perform the functions described in method 300 using one or more of the components described in FIGS. 1-2.

In method 300, at Block 302, transmission of a first type of traffic, that is subject to LBT, may be scheduled over first frequency resources of a sidelink in a time duration. In an aspect, FDM component 252, e.g., in conjunction with processor(s) 212, memory 216, transceiver 202, communicating component 142, etc., can schedule transmission of the first type of traffic, that is subject to LBT, over the first frequency resources of the sidelink in the time duration. For example, the first type of traffic can relate to V2X communications that do not include non-ultra-reliable QoS traffic. For example, the first type of traffic can be subject to LBT such that the UE 104 acquires a channel before transmitting the first type of traffic. Acquiring the channel via LBT can include listening on the channel to determine when the channel is clear for transmitting communications. In addition, acquiring the channel can include transmitting a request-to-send (RRQ) packet over the channel, and waiting to receive one or more respond for sending (RSP) signals from other devices before transmitting over the channel. In an example, FDM component 252 can then schedule the transmission of the first type of traffic when the channel is acquired. Scheduling the transmission of the first type of traffic may include selecting the first frequency resources of the sidelink over the time duration where the time duration occurs once the channel is acquired. The time duration may correspond to one or more orthogonal frequency division multiplexing (OFDM) symbols, single carrier frequency division multiplexing (SC-FDM) symbols, and/or the like, or a collection of symbols, a slot including a number of symbols, etc.

In method 300, at Block 304, transmission of an ultra-reliable QoS traffic, that is not subject to LBT, may be scheduled over second frequency resources of the sidelink in the same time duration. In an aspect, FDM component 252, e.g., in conjunction with processor(s) 212, memory 216, transceiver 202, communicating component 142, etc., can schedule transmission of the ultra-reliable QoS traffic, that is not subject to LBT, over the second frequency resources of the sidelink in the same time duration. In this regard, the first type of traffic and ultra-reliable QoS traffic can be multiplexed in the same time duration to facilitate concurrent transmission thereof in the time duration. Multiplexing the transmission in this regard can increase packet reception probability as compared to separately transmitting the first type of traffic and ultra-reliable QoS traffic, as half-duplexing only occurs once for both transmissions instead of for each transmission. For example, ultra-reliable QoS incoming transmissions may be otherwise lost at a UE 104 while doing other types of traffic transmission. Thus, the UE 104 can align these types of transmissions in the time domain using FDM, as described above when possible. In one example, FDM component 252 can multiplex the transmissions based at least in part on determining that corresponding buffers include data to be transmitted. In addition, in an example, FDM component 252 can determine to multiplex the transmissions based at least in part on receiving an indication (e.g., from a base station, one or more other UEs, etc.) that transmissions can be multiplexed over the frequency resources of the sidelink channel.

In method 300, at Block 306, the first type of traffic data can be transmitted over the first frequency resources of the sidelink in the scheduled time duration, and at Block 308, the ultra-reliable QoS traffic can be transmitted over the second frequency resources of the sidelink in the same scheduled time duration. In an aspect, communicating component 142, e.g., in conjunction with processor(s) 212, memory 216, transceiver 202, etc., can transmit the first type of traffic data over the first frequency resources of the sidelink in the scheduled time duration, and the ultra-reliable QoS traffic over the second frequency resources of the sidelink in the same scheduled time duration. For example, communicating component 142 may concurrently transmit two signals each having the associated traffic, transmit a single signal with the two types of traffic multiplexed in different resource blocks (RB) in frequency, etc. In addition, for example, the time duration may correspond to one or more symbols, such as an OFDM symbol, SC-FDM symbol, etc., and may include a single symbol, a collection of one or more symbols, a slot (which can include the collection of one or more symbols), a subframe (which can include multiple slots), and/or the like, as described.

Figure 4:
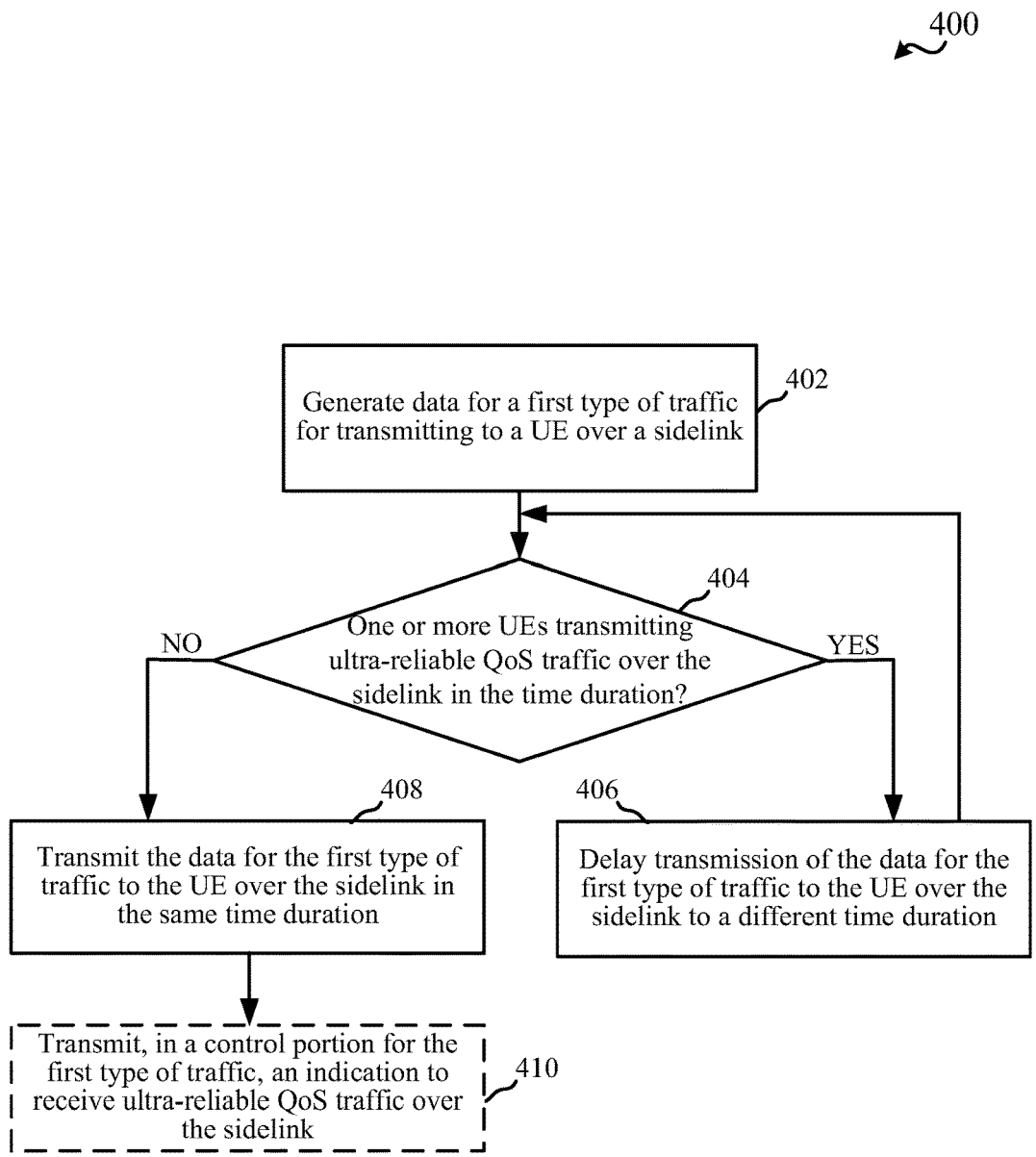
FIG. 4 is a flow chart illustrating an example of a method for time division multiplexing other traffic with ultra-reliable QoS traffic, in accordance with various aspects of the present disclosure.

FIG. 4 illustrates a flow chart of an example of a method 400 for applying TDM to different types of traffic in wireless communications. In an example, a UE 104 can perform the functions described in method 400 using one or more of the components described in FIGS. 1-2.

In method 400, at Block 402, data for a first type of traffic can be generated for transmitting to a UE over a sidelink. In an aspect, TDM component 254, e.g., in conjunction with processor(s) 212, memory 216, transceiver 202, communicating component 142, etc., can generate the data for the first type of traffic for transmitting to the UE (e.g., a UE other than UE 104 in FIG. 2) over the sidelink. In an example, the UE can include one or more UEs within a communication range of UE 104, e.g., that can successfully receive and decode signals transmitted by the UE 104 over the sidelink. For example, the first type of traffic may be non-ultra-reliable QoS traffic, which can be subject to LBT, as described. The data can be generated by an application executing on the UE 104. In one example, the first type of traffic can yield to ultra-reliable QoS transmissions, such that ultra-reliable QoS transmissions can be transmitted over or instead of the first type of traffic.

Thus, in method 400, at Block 404, it can be determined whether one or more UEs are transmitting ultra-reliable QoS traffic over the sidelink in the time duration. In an aspect, TDM component 254, e.g., in conjunction with processor(s) 212, memory 216, transceiver 202, communicating component 142, etc., can determine whether the one or more UEs are transmitting the ultra-reliable QoS traffic over the sidelink in the time duration. In one example, ultra-reliable QoS transmissions and normal traffic transmissions can be cascaded in time such that an ultra-reliable QoS transmission can start a number of OFDM symbols earlier than a normal transmission. In this regard, when a UE attempts to transmit its own normal traffic, it can determine if there are other ultra-reliable QoS transmissions (e.g., other UEs transmitting ultra-reliable QoS transmissions) in the network by detecting the start of the ultra-reliable QoS transmissions in the earlier OFDM symbols. As described further here, the UE can accordingly delay or otherwise back-off transmission of the normal traffic to yield to the other ultra-reliable QoS transmissions.

In this example, where it is determined at Block 404 that one or more UEs are transmitting ultra-reliable QoS traffic over the sidelink in the time duration, at Block 406, transmission of the data for the first type traffic to the UE over the sidelink can be delayed to a different time duration. In an aspect, TDM component 254, e.g., in conjunction with processor(s) 212, memory 216, transceiver 202, communicating component 142, etc., can delay the transmission of the data for the first type of traffic to the UE over the sidelink to the different time duration. In this regard, TDM component 254 can avoid transmitting normal traffic when it is determined that other UEs are transmitting ultra-reliable QoS traffic such to avoid interference for the ultra-reliable QoS traffic. For example, TDM component 254 can delay the transmission until the different time duration, which may include a next transmission opportunity, a new acquisition of the channel in LBT, a known or determined number of symbols or slots after the ultra-reliable QoS traffic, etc. In an example, this can include proceeding to Block 404 in the different time duration to again determine whether one or more UEs are transmitting ultra-reliable QoS traffic in the different time duration (e.g., in which case TDM component 254 may further delay to another subsequent time duration).

Where it is determined at Block 404 that one or more UEs are transmitting ultra-reliable QoS traffic over the sidelink in the time duration, at Block 408, data for the first type traffic can be transmitted to the UE over the sidelink in the same time duration. In an aspect, TDM component 254, e.g., in conjunction with processor(s) 212, memory 216, transceiver 202, communicating component 142, etc., can transmit the data for the first type of traffic to the UE (which may include one or more UEs able to receive and/or that have indicated an interest in receiving transmissions from the UE 104) over the sidelink in the same time duration. Thus, for example, the channel can be assumed clear of ultra-reliable QoS traffic, and the UE 104 can accordingly transmit normal traffic data (e.g., which may be based on LBT).

In addition, a UE transmitting normal traffic data can inform whether it desires to receive ultra-reliable QoS transmissions, such that another UE transmitting ultra-reliable QoS traffic can delay or otherwise back-off transmission of the ultra-reliable QoS traffic until the UE transmitting the normal traffic data is finished transmitting. In this example, in method 400, optionally at 410, an indication to receive ultra-reliable QoS traffic over the sidelink can be transmitted in a control portion for the first type of traffic. In an aspect, TDM component 254, e.g., in conjunction with processor(s) 212, memory 216, transceiver 202, communicating component 142, etc., can transmit, in the control portion for the first type of traffic, the indication to receive the ultra-reliable QoS traffic over the sidelink. As described, one or more UEs transmitting ultra-reliable QoS traffic can receive the normal traffic and corresponding control data, can determine from the control portion that the UE 104 requests to receive ultra-reliable QoS traffic, and can accordingly wait for the normal traffic transmission to end before sending ultra-reliable QoS traffic, as described further herein.

Figure 5:
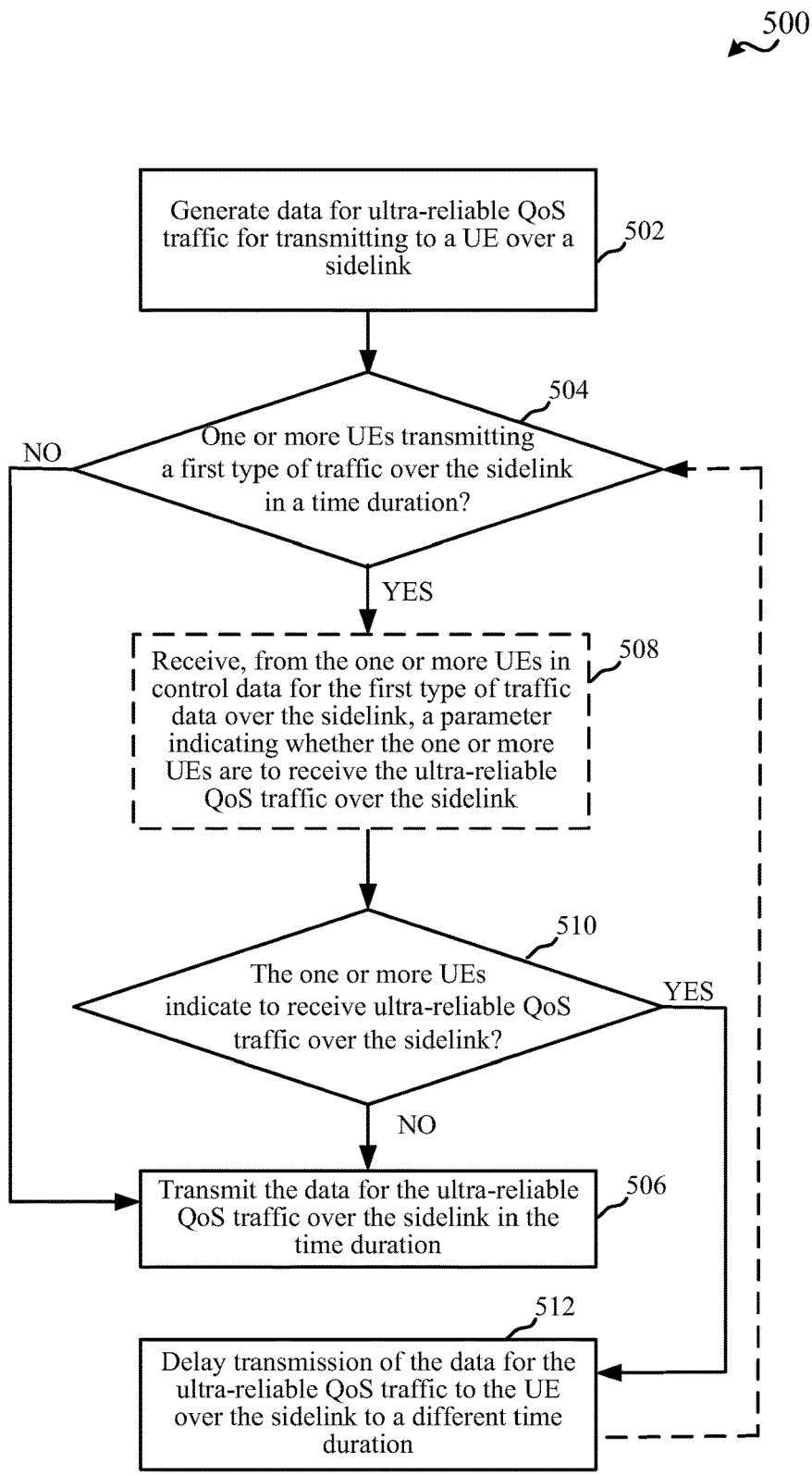
FIG. 5 is a flow chart illustrating an example of a method for time division multiplexing ultra-reliable QoS traffic with other traffic, in accordance with various aspects of the present disclosure.

FIG. 5 illustrates a flow chart of an example of a method 500 for applying TDM to different types of traffic in wireless communications. In an example, a UE 104 can perform the functions described in method 500 using one or more of the components described in FIGS. 1-2.

In method 500, at Block 502, data for ultra-reliable QoS traffic can be generated for transmitting to a UE over a sidelink. In an aspect, TDM component 254, e.g., in conjunction with processor(s) 212, memory 216, transceiver 202, communicating component 142, etc., can generate the data for ultra-reliable QoS traffic for transmitting to the UE (e.g., a UE other than UE 104 in FIG. 2) over the sidelink. For example, the ultra-reliable QoS traffic may not be subject to LBT, as opposed to normal traffic, as described. The data can be generated by an application executing on the UE 104. In one example, the ultra-reliable QoS traffic can yield to normal traffic where it is known that one or more UEs are transmitting normal traffic and/or are interested in receiving ultra-reliable QoS traffic.

Thus, in method 500, at Block 504, it can be determined whether one or more UEs are transmitting a first type of traffic over the sidelink in a time duration. In an aspect, TDM component 254, e.g., in conjunction with processor(s) 212, memory 216, transceiver 202, communicating component 142, etc., can determine whether the one or more UEs are transmitting the first type of traffic over the sidelink in the time duration. For example, TDM component 254 can receive at least a control portion of the first type of traffic over the sidelink in the time duration before determining to transmit the ultra-reliable QoS.

Where the one or more UEs are not transmitting the first type of traffic over the sidelink in the time duration at Block 504, at Block 506, the data can be transmitted for the ultra-reliable QoS traffic over the sidelink in the time duration. In an aspect, TDM component 254, e.g., in conjunction with processor(s) 212, memory 216, transceiver 202, communicating component 142, etc., can transmit the data for the ultra-reliable QoS traffic over the sidelink in the time duration. As described, this can include TDM component 254 transmitting the ultra-reliable QoS traffic without LBT and/or in a manner to achieve associated reliability and/or latency requirements for the traffic. In an example, the time duration for transmitting the ultra-reliable QoS traffic may be scheduled among UEs, and/or the like. In addition, as described, the time duration for transmitting ultra-reliable QoS traffic may be configured to be an offset from a different time duration for transmitting data of the first type of traffic and/or performing corresponding LBT.

Where the one or more UEs are transmitting the first type of traffic over the sidelink in the time duration at Block 504, optionally at Block 508, a parameter indicating whether the one or more UEs are to receive ultra-reliable QoS traffic over the sidelink can be received from the one or more UEs in control data for the first type of traffic. In an aspect, TDM component 254, e.g., in conjunction with processor(s) 212, memory 216, transceiver 202, communicating component 142, etc., can receive, from the one or more UEs in the control data for the first type of traffic over the sidelink, the parameter indicating whether the one or more UEs are to receive the ultra-reliable QoS traffic over the sidelink. For example, the indicator can be received in control data or other transmissions by or associated with the one or more UEs, such as in a NR physical sidelink control channel (NRPSCCH).

In this example, method 500 can include, at Block 510, determining whether the one or more UEs indicate to receive ultra-reliable QoS traffic over the sidelink. In an aspect, TDM component 254, e.g., in conjunction with processor(s) 212, memory 216, transceiver 202, communicating component 142, etc., can determine whether the one or more UEs indicate to receive the ultra-reliable QoS traffic over the sidelink. As described, this may be based on the indicator received from the one or more UEs or other indicators received from other devices and/or a network indicating whether the one or more other UEs are interested in receiving the ultra-reliable QoS traffic. If so, this can indicate that the UE 104 should delay or back-off transmission of the ultra-reliable QoS traffic while the one or more other UEs are transmitting normal traffic.

Thus, where the one or more UEs indicate to receive the ultra-reliable QoS traffic over the sidelink at Block 510, at Block 512, transmission of the data for ultra-reliable QoS traffic to the UE over the sidelink can be delayed to a different time duration. In an aspect, TDM component 254, e.g., in conjunction with processor(s) 212, memory 216, transceiver 202, communicating component 142, etc., can delay the transmission of the data for the ultra-reliable QoS traffic to the UE over the sidelink to the different time duration (e.g., a different symbol, subframe, etc.). In one example, the method 500 can proceed to Block 504 in a different time duration to again determine whether one or more UEs are transmitting the first type of traffic over the sidelink in the different time duration. In another example, TDM component 254 may select the different time duration for transmitting the ultra-reliable QoS traffic, receive an indication of a time duration over which to transmit the ultra-reliable QoS traffic, etc.

Where the one or more UEs do not indicate to receive the ultra-reliable QoS traffic over the sidelink at Block 510, method 500 can proceed to Block 506 to transmit the data for the ultra-reliable QoS traffic over the sidelink in the time duration, as described. This can occur since the one or more UEs do not need to half-duplex to receive the ultra-reliable QoS traffic when transmitting the normal traffic. In another example, TDM component 254 can determine to transmit the ultra-reliable QoS traffic a certain number of symbols, slots, etc. after transmission of the normal traffic by the one or more other UEs. Examples of applying TDM to normal and/or ultra-reliable QoS traffic are shown in FIG. 6.

Figure 6:
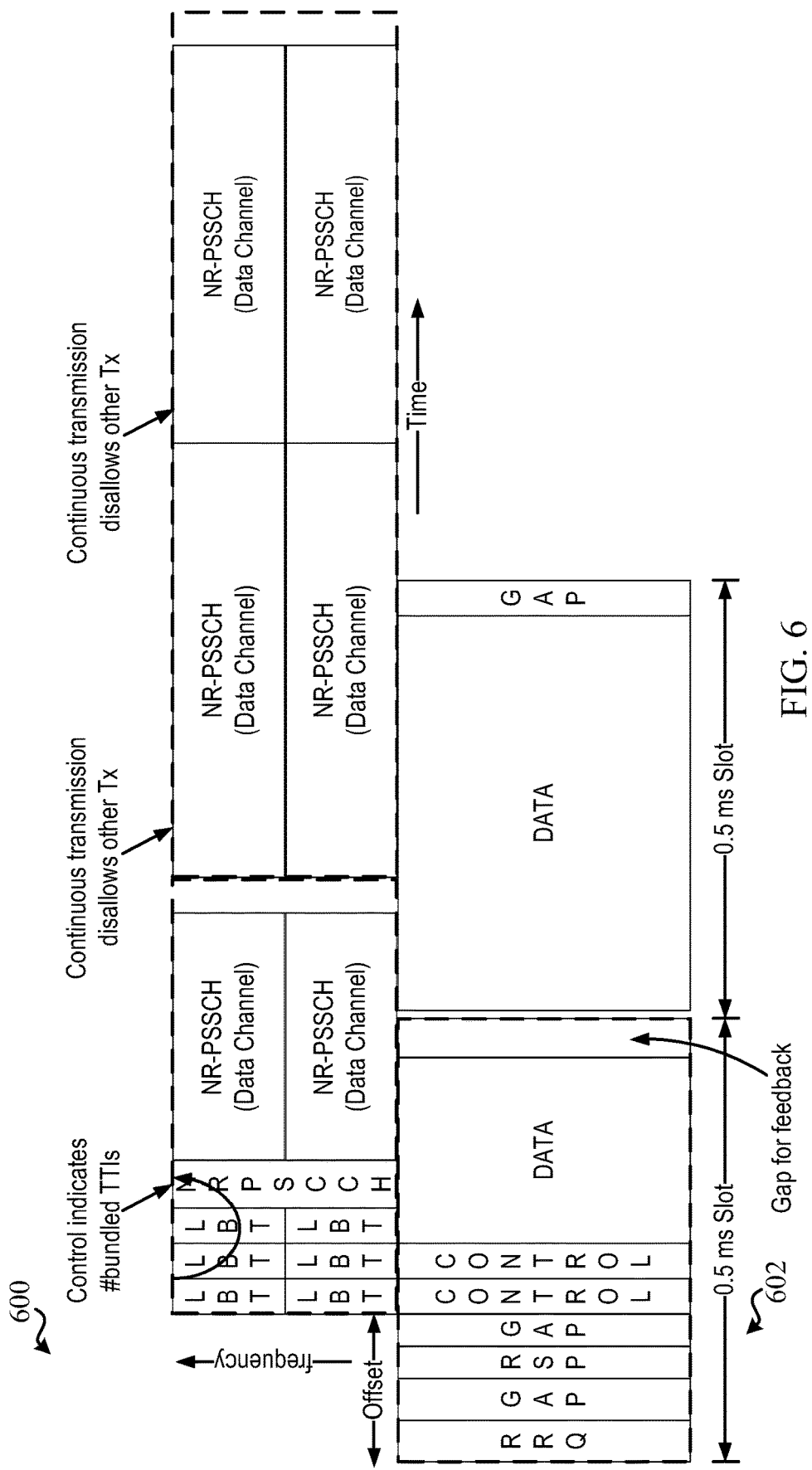
FIG. 6 is an example of resource allocation for ultra-reliable QoS traffic and other traffic, in accordance with various aspects of the present disclosure.

FIG. 6 illustrates an example of a normal traffic transmission 600 and an ultra-reliable QoS traffic transmission 602. As shown, the ultra-reliable QoS traffic transmission 602 begins before the normal traffic transmission 600 in the time duration, and the normal traffic transmission 600 can include LBT symbols for acquiring a channel to transmit the data, and transmitted data can include control data transmitted over NRPSCCH and/or data transmitted over a NR physical sidelink shared channel (NRPSSCH). Thus, for example, where TDM component 254 is attempting to transmit normal traffic, TDM component 254 can attempt to detect ultra-reliable QoS traffic transmissions from other UEs in the portion of the time duration (e.g., one or more symbols) before LBT is attempted, and can back-off (e.g., refrain from performing LBT and/or refrain from transmitting NRPSCCH/NRPSSCH data) if such transmissions are detected. For example, TDM component 254 can attempt to detect a request to send (RRQ), respond to send (RSP), control data, etc. related to the ultra-reliable QoS transmissions. In another example, where TDM component 254 is attempting to transmit ultra-reliable QoS traffic, TDM component 254 can attempt to detect normal traffic transmissions from other UEs in the time duration, and can back-off (e.g., refrain from sending RRQ and/or refrain from transmitting ultra-reliable QoS control data and/or data) if such transmissions are detected and/or if such transmissions include control data (e.g., NRPSCCH) indicating a desire to receive ultra-reliable QoS traffic.

In this example, the UE 104 can ensure its normal traffic transmissions do not overlap with any other UE's ultra-reliable QoS transmissions (e.g., possibly avoiding half duplex impact to itself), and/or that its ultra-reliable QoS transmissions do not overlap with any other UE's normal traffic transmissions if the other UE is interested in receiving ultra-reliable QoS traffic (e.g., possibly avoiding half duplex impact to other UEs). Thus, in the example in FIG. 6, ultra-reliable QoS transmissions and normal traffic transmissions are cascaded in time (e.g., an ultra-reliable QoS transmission can start a few OFDM symbol earlier than a normal transmission). This way, when a UE attempts to transmit its own normal traffic, it knows, or can determine, if there are other ultra-reliable QoS transmissions going on in the network and can accordingly back-off, as described. In another example, one bit can be added in the control of normal traffic to inform if the UE transmitting normal traffic is interested in receiving ultra-reliable QoS transmissions. This way, a UE attempting to start its own ultra-reliable QoS transmission can be aware of this and accordingly back-off.

Figure 7:
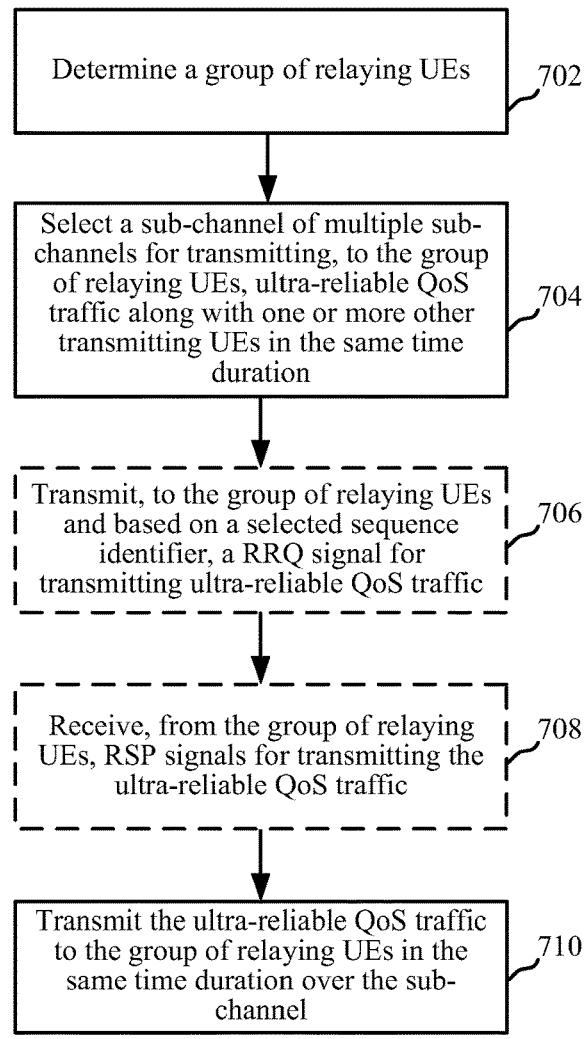
FIG. 7 is a flow chart illustrating an example of a method for transmitting ultra-reliable QoS traffic to be relayed, in accordance with various aspects of the present disclosure.

FIG. 7 illustrates a flow chart of an example of a method 700 for relaying ultra-reliable QoS traffic. In this example, relaying and (optional) network coding can be used to form a virtual uplink (UL)/downlink (DL) separation for ultra-reliable traffic. For example, a first transmission from an ultra-reliable QoS packet originating UE to the relaying UE can be referred to in these examples as the UL, and the relaying transmission from relaying UE to all other UEs can be referred to in these examples as the DL. Thus, the half-duplexing issues described above can be solved if the UL and DL can be separated in time domain. In an example, a UE 104 can perform the functions described in method 700 using one or more of the components described in FIGS. 1-2.

In method 700, at Block 702, a group of relaying UEs can be determined. In an aspect, relaying component 256, e.g., in conjunction with processor(s) 212, memory 216, transceiver 202, communicating component 142, etc., can determine the group of relaying UEs. In an example, relaying component 256 can determine the group of relaying UEs based on receiving signals from the relaying UEs. The group of relaying UEs may include one or more relaying UEs. In one example, each relaying UE can transmit a signal to relay or to be relayed, and the relaying component 256 of UE 104 can receive these signals and detect the group of relaying UEs based on one or more identifiers in the signal (e.g., an identifier of or associated with the relaying UE, which may include a radio network temporary identifier, a subscription identifier, another node identified assigned by the network, etc.). In another example, relaying UEs can randomly elect to be a relayer and can broadcast this information to the UE 104, which can be received and processed to determine the group of relaying UEs by relaying component 256. In this example, the random election may be based at least in part on a location of the UE deciding to be a relayer (e.g., with respect to UE 104 and/or otherwise). In yet another example, relaying component 256 can instruct one or more UEs to be relaying UEs, and can determine the group in this regard (e.g., based on one or more determined parameters of the one or more UEs, a location of the one or more UEs, etc.).

In method 700, at Block 704, a sub-channel of multiple sub-channels can be selected for transmitting, to the group of relaying UEs, ultra-reliable QoS traffic along with one or more other transmitting UEs in the same time duration. In an aspect, relaying component 256, e.g., in conjunction with processor(s) 212, memory 216, transceiver 202, communicating component 142, etc., can select the sub-channel of multiple sub-channels for transmitting, to the group of relaying UEs, ultra-reliable QoS traffic along with one or more other transmitting UEs in the same time duration. In one example, relaying component 256 can randomly determine the sub-channel from a set of sub-channels configured or defined for transmitting initial ultra-reliable QoS transmissions. For example, the sub-channel(s) can be defined based on a set of frequency resources over a time duration, where the time duration may occur based on transmitting an RRQ signal and/or receiving RSP signals, as described further herein.

In method 700, optionally at Block 706, a RRQ signal for transmitting ultra-reliable QoS traffic can be transmitted to the group of relaying UEs based on a selected sequence identifier. In an aspect, relaying component 256, e.g., in conjunction with processor(s) 212, memory 216, transceiver 202, communicating component 142, etc., can transmit, to the group of relaying UEs and based on a selected sequence identifier, a RRQ signal for transmitting ultra-reliable QoS traffic. In this example, relaying component 256 can select the sequence identifier from a set of sequence identifiers assigned to the UE 104 for transmitting initial ultra-reliable QoS traffic. The selected sequence identifier can be used to determine which transmission is to yield in the case that both are concurrently transmitted.

In method 700, optionally at Block 708, RSP signals for transmitting ultra-reliable QoS traffic can be received from the group of relaying UEs. In an aspect, relaying component 256, e.g., in conjunction with processor(s) 212, memory 216, transceiver 202, communicating component 142, etc., can receive, from the group of relaying UEs, RSP signals for transmitting the ultra-reliable QoS traffic. For example, the group of relaying UEs can transmit the RSP signals based on not having any traffic to relay. In another example, the group of relaying UEs can compare the sequence identifier received in the RRQ signal to a sequence identifier assigned to an initial ultra-reliable QoS transmission attempt by the group of relaying UEs, can compare the received sequence identifier to the identifiers selected by the group of relaying UEs. Where the received sequence identifier is higher, for example, relaying component 256 can accordingly back-off the initial transmission attempt (and thus become one of the group of relaying UEs), can transmit a RSP signal, and/or the like.

In method 700, at Block 710, the ultra-reliable QoS traffic can be transmitted to the group of relaying UEs in the same time duration over the sub-channel. In an aspect, relaying component 256, e.g., in conjunction with processor(s) 212, memory 216, transceiver 202, communicating component 142, etc., can transmit the ultra-reliable QoS traffic to the group of relaying UEs in the same time duration over the sub-channel. For example, relaying component 256 can transmit the ultra-reliable QoS traffic based on receiving the RSP signals, based on determining that the selected sequence identifier is higher than that received in other RSP signals, etc. In one example, relaying component 256 can transmit the ultra-reliable QoS traffic based on not receiving RSP signals. In any case, for example, the group of relaying UEs can then relay the ultra-reliable QoS traffic to additional UEs in a subsequent time duration (e.g., if the ultra-reliable QoS traffic has a highest sequence identifier of multiple ultra-reliable QoS traffic signals received over different sub-channels), as described further herein.

In one example, for the initial ultra-reliable QoS transmission, relaying component 256 can use a set of one or more sequence identifiers reserved for the UE 104. For the relay ultra-reliable QoS transmission, the group of relaying UEs can use another set of one or more sequence identifiers reserved for those UEs. The RRQ identifier of relay transmissions can be higher than that of initial transmission (e.g., the lowest RRQ identifier of the set of RRQ identifiers for the relay transmissions can be higher than the highest RRQ identifier of the set of RRQ identifiers for initial transmissions), so if a relay and an initial transmission start at the same time, relaying component 256 can yield or back-off the initial transmission. For example, the sequence identifier can indicate a hierarchical position of the node in the network, such that higher positioned nodes can yield to transmissions of lower nodes (e.g., relaying nodes).

Figure 8:
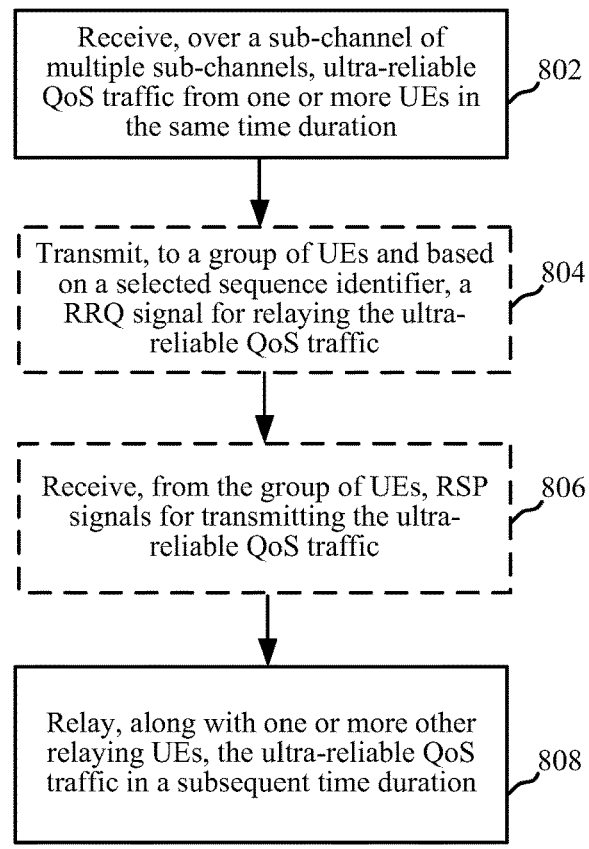
FIG. 8 is a flow chart illustrating an example of a method for relaying ultra-reliable QoS traffic, in accordance with various aspects of the present disclosure.

FIG. 8 illustrates a flow chart of an example of a method 800 for relaying received ultra-reliable QoS traffic. In an example, a UE 104 can perform the functions described in method 800 using one or more of the components described in FIGS. 1-2.

In method 800, at Block 802, ultra-reliable QoS traffic can be received, over a sub-channel of multiple sub-channels, from one or more UEs in the same time duration. In an aspect, relaying component 256, e.g., in conjunction with processor(s) 212, memory 216, transceiver 202, communicating component 142, etc., can receive, over a sub-channel of multiple sub-channels, ultra-reliable QoS traffic from one or more UEs in the same time duration. As described, for example, a UE can transmit an initial ultra-reliable QoS transmission to be relayed, and can do so after transmitting a RRQ and receiving RSPs from one or more UEs, including UE 104. As described, relaying component 256 of UE 104 can transmit a RSP to a UE from which an RRQ is received based on determining that the UE 104 does not have data to relay, based on comparing a sequence identifier in a RRQ signal from the UE to a sequence identifier selected by relaying component 256 for potentially transmitting traffic to be related, etc. In addition, in one example, relaying component 256 can select which UE's ultra-reliable QoS traffic to relay based on comparing a sequence identifier in the multiple RRQ signals received over the multiple sub-channels.

In method 800, optionally at Block 804, a RRQ signal can be transmitted to a group of UEs based on a selected sequence identifier for relaying the ultra-reliable QoS traffic. In an aspect, relaying component 256, e.g., in conjunction with processor(s) 212, memory 216, transceiver 202, communicating component 142, etc., can transmit, to the group of UEs and based on the selected sequence identifier, the RRQ signal for relaying the ultra-reliable QoS traffic. As described, for example, the group of UEs can include one or more UEs, which may be relaying UEs. In one example, relaying component 256 can select the sequence identifier from a set of sequence identifiers configured for the UE 104 for relaying ultra-reliable QoS traffic. In addition, for example, relaying component 256 can transmit the RRQ in a subsequent time duration (e.g., subsequent to the time duration during which the ultra-reliable QoS traffic is received from the one or more UEs). As described, relaying UEs can use a higher sequence identifier to cause initial ultra-reliable QoS transmissions to back-off in the subsequent time duration.

In method 800, optionally at Block 806, RSP signals for transmitting the ultra-reliable QoS traffic can be received from the group of UEs. In an aspect, relaying component 256, e.g., in conjunction with processor(s) 212, memory 216, transceiver 202, communicating component 142, etc., can receive, from the group of UEs, RSP signals for transmitting the ultra-reliable QoS traffic. For example, relaying component 256 can receive the RSP signals indicating that the UE 104 can relay the ultra-reliable QoS traffic (e.g., that the group of UEs do not have traffic to transmit or have a lower selected sequence identifier).

In method 800, at Block 808, the ultra-reliable QoS traffic can be relayed, along with one or more other relaying UEs, in a subsequent time duration. In an aspect, relaying component 256, e.g., in conjunction with processor(s) 212, memory 216, transceiver 202, communicating component 142, etc., can relay, along with one or more other relaying UEs, the ultra-reliable QoS traffic in the subsequent time duration. In an example, relaying component 256 can transmit the relay transmission over all of the multiple sub-channels. For example, relaying component 256 can transmit a relay transmission of the ultra-reliable QoS traffic (e.g., a transmission that is similar to or at least includes the same data as the original initial ultra-reliable QoS received at Block 802) based on receiving the RSP signals, based on determining that the selected sequence identifier is higher than that received in other RSP signals, etc. In one example, relaying component 256 can relay the ultra-reliable QoS traffic based on not receiving RSP signals.

In conjunction with FIGS. 7-8 described above, a UE with a high priority packet selects a sequence (e.g., out of 12) randomly and transmits RRQ. UEs interested in ultra-reliable QoS traffic that receive the RRQ can respond with a RSP (e.g., this can be the group of relaying UEs). Single Frequency Network like combining of RSP signals with the same sequence identifier can be used to clear other transmissions at a given UE. If multiple RRQ signals with different sequence identifier are received then the UEs can respond with RSP to the highest priority RRQ sequence identifier. This can ensure low interference for high QoS while maintaining good resource utilization. If a transmitting UE receives a RSP with a higher sequence identifier than it used for RRQ (e.g., not corresponding to its own sequence) then the UE can back-off. A successful transmitting UE can transmit control followed by data.

In an example, as described, for the first ultra-reliable QoS transmission, the transmitting UE can use a set of sequence identifiers reserved for it. For the relay ultra-reliable QoS transmission, the relaying UE can use another set of sequence identifiers reserved for it. Sequence identifier of relay transmission can be higher than that of first transmission, so if a relay and a first transmission start at the same time, the first transmission can yield. For the first ultra-reliable QoS transmission, relaying UEs can respond with RSP. The bandwidth allocated for ultra-reliable QoS transmissions can be divided into multiple sub-channels of the same size (e.g., in frequency). For the first ultra-reliable QoS transmission, the UE can randomly select one sub-channel for transmission, and multiple transmissions from multiple UEs can occur concurrently in different sub-channels. For the relay ultra-reliable QoS transmissions, the relaying UE can occupy all available sub-channels and transmit multiple relay packets in multiple sub-channels at the same time. Any packet generated by a relaying UE can also be considered as a relayed packet and treated accordingly.

Figure 9:
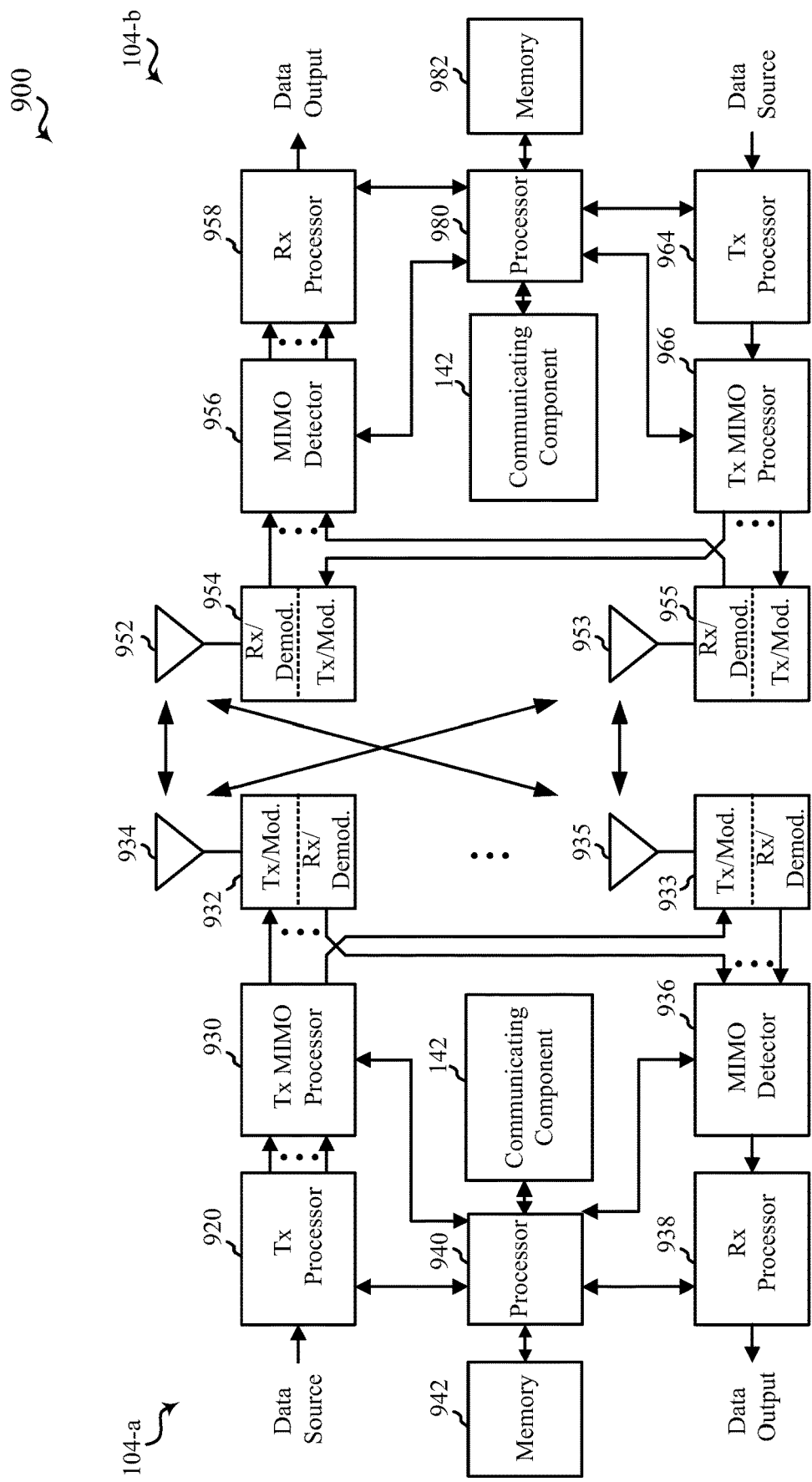
FIG. 9 is a block diagram illustrating an example of a MIMO communication system including a base station and a UE, in accordance with various aspects of the present disclosure.

FIG. 9 is a block diagram of a MIMO communication system 900 including UEs 104-a, 104-b. The MIMO communication system 900 may illustrate aspects of the wireless communication access network 100 described with reference to FIG. 1. The UE 104-*a* may be an example of aspects of the UE 104 described with reference to FIGS. 1-2. The UE 104-*a* may be equipped with antennas 934 and 935, and the UE 104-*b* may be equipped with antennas 952 and 953. In the MIMO communication system 900, the UEs 104-*a*, 104-*b* may be able to send data over multiple communication links at the same time. Each communication link may be called a "layer" and the "rank" of the communication link may indicate the number of layers used for communication. For example, in a 2×2 MIMO communication system where UE 104-*a* transmits two "layers," the rank of the communication link between the UE 104-*a* and the UE 104-*b* is two.

At the UE 104-*a*, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104-*b* may be an example of aspects of the UEs 104 described with reference to FIGS. 1-2. At the UE 104-*b*, the UE antennas 952 and 953 may receive the signals from the UE 104-*a* (e.g., over a sidelink) and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104-*b* to a data output, and provide decoded control information to a processor 980, or memory 982.

The processor 980 may in some cases execute stored instructions to instantiate a communicating component 142 (see e.g., FIGS. 1 and 2).

At the UE 104-*b*, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the UE 104-*a* in accordance with the communication parameters received from the UE 104-*a*. At the UE 104-*a*, the signals from the UE 104-*b* may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a communicating component 142 (see e.g., FIGS. 1 and 2).

The components of the UEs 104-*a*, 104-*b* may, individually or collectively, be implemented with one or more ASICs adapted to perform some or all of the applicable functions in hardware. Each of the noted modules may be a means for performing one or more functions related to operation of the MIMO communication system 900. Similarly, the components of the UE 104-*a* may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method of wireless communication, comprising:
   determining a group of relaying user equipment (UEs);
   selecting a sub-channel of multiple sub-channels for transmitting, to the group of relaying UEs, ultra-reliable quality-of-service (QoS) traffic along with one or more other transmitting UEs in the time duration; and
   transmitting the ultra-reliable QoS traffic to the group of relaying UEs in the same time duration over the sub-channel.

2. The method of example 1, further comprising:
   transmitting, to the group of relaying UEs and based on a selected sequence identifier, a request-to-send (RRQ) signal for transmitting the ultra-reliable QoS traffic;
   receiving, from the group of relaying UEs, Respond-to-send (RSP) signals for transmitting the ultra-reliable QoS traffic;
   wherein transmitting the ultra-reliable QoS traffic is based at least in part on determining that the selected sequence identifier in the RRQ signal is higher than an identifier associated with each of the RSP signals.

3. The method of example 2, wherein the selected sequence identifier is associated with a hierarchical position of a node in a network of transmitting UEs and relaying UEs.

4. The method of any of examples 2 or 3, further comprising:
   transmitting, to the group of relaying UEs and based on a selected sequence identifier, a request-to-send (RRQ) signal for transmitting the ultra-reliable QoS traffic,
   wherein transmitting the ultra-reliable QoS traffic is based at least in part on determining that no Respond-to-send (RSP) signals are received in response to the RRQ.

5. The method of any of examples 1 to 4, further comprising:
   receiving, over a second sub-channel of the multiple sub-channels, ultra-reliable quality-of-service (QoS) traffic from one or more UEs in the same time duration; and
   relaying, along with one or more other relaying UEs, the ultra-reliable QoS traffic in a subsequent time duration.

6. The method of example 5, further comprising:
   transmitting, to another group of UEs and based on a selected sequence identifier, a request-to-send (RRQ) signal for relaying the ultra-reliable quality-of-service (QoS) traffic;
   receiving, from the another group of UEs, Respond-to-send (RSP) signals for transmitting the ultra-reliable QoS traffic;
   wherein relaying the ultra-reliable QoS traffic is based at least in part on determining that the selected sequence identifier in the RRQ signal is equal or higher than an identifier associated with each of the RSP signals.

7. The method of example 6, wherein the selected sequence identifier is associated with a hierarchical position of a node in a network of transmitting UEs and relaying UEs.

8. The method of any of examples 5 to 7, further comprising:
   transmitting, to another group of UEs and based on a selected sequence identifier, a request-to-send (RRQ) signal for relaying the ultra-reliable quality-of-service (QoS) traffic,
   wherein relaying the ultra-reliable QoS traffic is based at least in part on determining that no Respond-to-send (RSP) signals are received in response to the RRQ.

9. An apparatus for wireless communication, comprising:
   a transceiver;
   a memory configured to store instructions; and one or more processors communicatively coupled with the transceiver and the memory, wherein the one or more processors are configured to:
   determine a group of relaying user equipment (UEs);
   select a sub-channel of multiple sub-channels for transmitting, to the group of relaying UEs, ultra-reliable quality-of-service (QoS) traffic along with one or more other transmitting UEs in the time duration; and
   transmit the ultra-reliable QoS traffic to the group of relaying UEs in the same time duration over the sub-channel.

10. The apparatus of example 9, wherein the one or more processors are further configured to:
   transmit, to the group of relaying UEs and based on a selected sequence identifier, a request-to-send (RRQ) signal for transmitting the ultra-reliable QoS traffic;
   receive, from the group of relaying UEs, Respond-to-send (RSP) signals for transmitting the ultra-reliable QoS traffic;

wherein the one or more processors are further configured to transmit the ultra-reliable QoS traffic based at least in part on determining that the selected sequence identifier in the RRQ signal is higher than an identifier associated with each of the RSP signals.

11. The apparatus of example 10, wherein the selected sequence identifier is associated with a hierarchical position of a node in a network of transmitting UEs and relaying UEs.

12. The apparatus of any of examples 10 or 11, wherein the one or more processors are further configured to:
 transmit, to the group of relaying UEs and based on a selected sequence identifier, a request-to-send (RRQ) signal for transmitting the ultra-reliable QoS traffic,
 wherein the one or more processors are configured to transmit the ultra-reliable QoS traffic based at least in part on determining that no Respond-to-send (RSP) signals are received in response to the RRQ.

13. The apparatus of any of examples 9 to 12, wherein the one or more processors are further configured to:
 receive, over a second sub-channel of the multiple sub-channels, ultra-reliable quality-of-service (QoS) traffic from one or more UEs in the same time duration; and
 relay, along with one or more other relaying UEs, the ultra-reliable QoS traffic in a subsequent time duration.

14. The apparatus of example 13, wherein the one or more processors are further configured to:
 transmit, to another group of UEs and based on a selected sequence identifier, a request-to-send (RRQ) signal for relaying the ultra-reliable quality-of-service (QoS) traffic;
 receive, from the another group of UEs, Respond-to-send (RSP) signals for transmitting the ultra-reliable QoS traffic;
 wherein the one or more processors are configured to relay the ultra-reliable QoS traffic based at least in part on determining that the selected sequence identifier in the RRQ signal is equal or higher than an identifier associated with each of the RSP signals.

15. The apparatus of example 14, wherein the selected sequence identifier is associated with a hierarchical position of a node in a network of transmitting UEs and relaying UEs.

16. The apparatus of any of examples 13 to 15, wherein the one or more processors are further configured to:
 transmit, to another group of UEs and based on a selected sequence identifier, a request-to-send (RRQ) signal for relaying the ultra-reliable quality-of-service (QoS) traffic,
 wherein the one or more processors are configured to relay the ultra-reliable QoS traffic is based at least in part on determining that no Respond-to-send (RSP) signals are received in response to the RRQ.

17. An apparatus of wireless communication, comprising:
 means for determining a group of relaying user equipment (UEs);
 means for selecting a sub-channel of multiple sub-channels for transmitting, to the group of relaying UEs, ultra-reliable quality-of-service (QoS) traffic along with one or more other transmitting UEs in the time duration; and
 means for transmitting the ultra-reliable QoS traffic to the group of relaying UEs in the same time duration over the sub-channel.

18. The apparatus of example 17, further comprising:
 means for transmitting, to the group of relaying UEs and based on a selected sequence identifier, a request-to-send (RRQ) signal for transmitting the ultra-reliable QoS traffic;
 means for receiving, from the group of relaying UEs, Respond-to-send (RSP) signals for transmitting the ultra-reliable QoS traffic;
 wherein the means for transmitting the ultra-reliable QoS traffic is based at least in part on determining that the selected sequence identifier in the RRQ signal is higher than an identifier associated with each of the RSP signals.

19. The apparatus of example 18, wherein the selected sequence identifier is associated with a hierarchical position of a node in a network of transmitting UEs and relaying UEs.

20. The apparatus of any of examples 18 or 19, further comprising:
 means for transmitting, to the group of relaying UEs and based on a selected sequence identifier, a request-to-send (RRQ) signal for transmitting the ultra-reliable QoS traffic,
 wherein the means for transmitting the ultra-reliable QoS traffic is based at least in part on determining that no Respond-to-send (RSP) signals are received in response to the RRQ.

21. The apparatus of any of examples 17 to 20, further comprising:
 means for receiving, over a second sub-channel of the multiple sub-channels, ultra-reliable quality-of-service (QoS) traffic from one or more UEs in the same time duration; and
 means for relaying, along with one or more other relaying UEs, the ultra-reliable QoS traffic in a subsequent time duration.

22. The apparatus of example 21, further comprising:
 means for transmitting, to another group of UEs and based on a selected sequence identifier, a request-to-send (RRQ) signal for relaying the ultra-reliable quality-of-service (QoS) traffic;
 means for receiving, from the another group of UEs, Respond-to-send (RSP) signals for transmitting the ultra-reliable QoS traffic;
 wherein the means for relaying the ultra-reliable QoS traffic is based at least in part on determining that the selected sequence identifier in the RRQ signal is equal or higher than an identifier associated with each of the RSP signals.

23. The apparatus of example 22, wherein the selected sequence identifier is associated with a hierarchical position of a node in a network of transmitting UEs and relaying UEs.

24. The apparatus of any of examples 21 to 23, further comprising:
 means for transmitting, to another group of UEs and based on a selected sequence identifier, a request-to-send (RRQ) signal for relaying the ultra-reliable quality-of-service (QoS) traffic,
 means for wherein relaying the ultra-reliable QoS traffic is based at least in part on determining that no Respond-to-send (RSP) signals are received in response to the RRQ.

25. A non-transitory computer-readable medium, comprising code executable by one or more processors for wireless communications, the code comprising code for:
 determining a group of relaying user equipment (UEs);
 selecting a sub-channel of multiple sub-channels for transmitting, to the group of relaying UEs, ultra-reliable quality-of-service (QoS) traffic along with one or more other transmitting UEs in the time duration; and
 transmitting the ultra-reliable QoS traffic to the group of relaying UEs in the same time duration over the sub-channel.

26. The non-transitory computer-readable medium of example 25, further comprising:
  code for transmitting, to the group of relaying UEs and based on a selected sequence identifier, a request-to-send (RRQ) signal for transmitting the ultra-reliable QoS traffic;
  code for receiving, from the group of relaying UEs, Respond-to-send (RSP) signals for transmitting the ultra-reliable QoS traffic;
  wherein the code for transmitting the ultra-reliable QoS traffic is based at least in part on determining that the selected sequence identifier in the RRQ signal is higher than an identifier associated with each of the RSP signals.

27. The non-transitory computer-readable medium of example 26, further comprising:
  code for transmitting, to the group of relaying UEs and based on a selected sequence identifier, a request-to-send (RRQ) signal for transmitting the ultra-reliable QoS traffic,
  wherein the code for transmitting the ultra-reliable QoS traffic is based at least in part on determining that no Respond-to-send (RSP) signals are received in response to the RRQ.

28. The non-transitory computer-readable medium of any of examples 25 to 27, further comprising:
  code for receiving, over a second sub-channel of the multiple sub-channels, ultra-reliable quality-of-service (QoS) traffic from one or more UEs in the same time duration; and
  code for relaying, along with one or more other relaying UEs, the ultra-reliable QoS traffic in a subsequent time duration.

29. The non-transitory computer-readable medium of example 28, further comprising:
  code for transmitting, to another group of UEs and based on a selected sequence identifier, a request-to-send (RRQ) signal for relaying the ultra-reliable quality-of-service (QoS) traffic;
  code for receiving, from the another group of UEs, Respond-to-send (RSP) signals for transmitting the ultra-reliable QoS traffic;
  wherein the code for relaying the ultra-reliable QoS traffic is based at least in part on determining that the selected sequence identifier in the RRQ signal is equal or higher than an identifier associated with each of the RSP signals.

30. The non-transitory computer-readable medium of any of examples 28 or 29, further comprising:
  code for transmitting, to another group of UEs and based on a selected sequence identifier, a request-to-send (RRQ) signal for relaying the ultra-reliable quality-of-service (QoS) traffic,
  code for wherein relaying the ultra-reliable QoS traffic is based at least in part on determining that no Respond-to-send (RSP) signals are received in response to the RRQ.

What is claimed is:

1. An apparatus for wireless communication, comprising:
  a transceiver;
  a memory configured to store instructions; and
  one or more processors communicatively coupled with the transceiver and the memory, wherein the one or more processors are configured to:
    receive, over a sub-channel of multiple sub-channels, ultra-reliable quality-of-service (QoS) traffic from one or more user equipment (UEs) over a time duration wherein other sub-channels of the multiple sub-channels are used for initial ultra-reliable QoS transmissions from one or more other transmitting UEs over the time duration; and
    relay, along with one or more other relaying UEs, the ultra-reliable QoS traffic over a subsequent time duration.

2. The apparatus of claim 1, wherein the one or more processors are further configured to receive, from the one or more UEs, a request-to-send (RRQ) signal for transmitting the ultra-reliable QoS traffic, wherein the one or more processors are configured to relay the ultra-reliable QoS traffic based at least in part on comparing a sequence identifier received in the RRQ to a selected sequence identifier selected by the apparatus for transmitting over the time duration.

3. The apparatus of claim 2, wherein the one or more processors are further configured to transmit, to the one or more UEs, a Respond-to-send (RSP) signal based on the sequence identifier being a highest sequence identifier received in multiple RRQ signals from multiple UEs including the one or more UEs.

4. The apparatus of claim 2, wherein the selected sequence identifier is associated with a hierarchical position of a node in a network of transmitting UEs and relaying UEs.

5. The apparatus of claim 1, wherein the one or more processors are further configured to:
  transmit, to the one or more other relaying UEs and based on a selected sequence identifier, a request-to-send (RRQ) signal for relaying the ultra-reliable QoS traffic; and
  receive, from the one or more other relaying UEs, one or more Respond-to-send (RSP) signals for transmitting the ultra-reliable QoS traffic,
  wherein the one or more processors are configured to relay the ultra-reliable QoS traffic based at least in part on determining that the selected sequence identifier in the RRQ signal is higher than an identifier associated with each of the RSP signals.

6. The apparatus of claim 5, wherein the selected sequence identifier is configured for the apparatus for relaying the ultra-reliable QoS traffic.

7. The apparatus of claim 1, wherein the one or more processors are further configured to:
  transmit, to the one or more relaying UEs and based on a selected sequence identifier, a request-to-send (RRQ) signal for transmitting the ultra-reliable QoS traffic,
  wherein the one or more processors are configured to relay the ultra-reliable QoS traffic based at least in part on determining that no Respond-to-send (RSP) signals are received in response to the RRQ.

8. The apparatus of claim 7, wherein the selected sequence identifier is configured for the apparatus for relaying the ultra-reliable QoS traffic.

9. The apparatus of claim 1, wherein the one or more processors are configured to relay the ultra-reliable QoS traffic over all of the multiple sub-channels over the subsequent time duration.

10. A method for wireless communication, comprising at a relaying user equipment (UE):
  receiving, over a sub-channel of multiple sub-channels, ultra-reliable quality-of-service (QoS) traffic from one or more UEs over a time duration wherein other sub-channels of the multiple sub-channels are used for initial ultra-reliable QoS transmissions from one or more other transmitting UEs over the time duration; and relaying, along with one or more other relaying UEs, the ultra-reliable QoS traffic over a subsequent time duration.

11. The method of claim 10, further comprising receiving, from the one or more UEs, a request-to-send (RRQ) signal for transmitting the ultra-reliable QoS traffic, wherein relaying the ultra-reliable QoS traffic is based at least in part on comparing a sequence identifier received in the RRQ to a selected sequence identifier selected by the relaying UE for transmitting over the time duration.

12. The method of claim 11, further comprising transmitting, to the one or more UEs, a Respond-to-send (RSP) signal based on the sequence identifier being a highest sequence identifier received in multiple RRQ signals from multiple UEs including the one or more UEs.

13. The method of claim 11, wherein the selected sequence identifier is associated with a hierarchical position of a node in a network of transmitting UEs and relaying UEs.

14. The method of claim 10, further comprising:
transmitting, to the one or more other relaying UEs and based on a selected sequence identifier, a request-to-send (RRQ) signal for relaying the ultra-reliable QoS traffic; and
receiving, from the one or more other relaying UEs, one or more Respond-to-send (RSP) signals for transmitting the ultra-reliable QoS traffic,
wherein relaying the ultra-reliable QoS traffic is based at least in part on determining that the selected sequence identifier in the RRQ signal is higher than an identifier associated with each of the RSP signals.

15. The method of claim 14, wherein the selected sequence identifier is configured for the relaying UE for relaying the ultra-reliable QoS traffic.

16. The method of claim 10, further comprising:
transmitting, to the one or more relaying UEs and based on a selected sequence identifier, a request-to-send (RRQ) signal for transmitting the ultra-reliable QoS traffic,
wherein relaying the ultra-reliable QoS traffic is based at least in part on determining that no Respond-to-send (RSP) signals are received in response to the RRQ.

17. The method of claim 16, wherein the selected sequence identifier is configured for the relaying UE for relaying the ultra-reliable QoS traffic.

18. The method of claim 10, wherein relaying the ultra-reliable QoS traffic is over all of the multiple sub-channels over the subsequent time duration.

19. A non-transitory computer-readable medium, comprising code executable by one or more processors for wireless communications, the code comprising code for:
receiving, over a sub-channel of multiple sub-channels, ultra-reliable quality-of-service (QoS) traffic from one or more UEs over a time duration wherein other sub-channels of the multiple sub-channels are used for initial ultra-reliable QoS transmissions from one or more other transmitting UEs over the time duration; and
relaying, along with one or more other relaying UEs, the ultra-reliable QoS traffic over a subsequent time duration.

20. The non-transitory computer-readable medium of claim 19, further comprising code for receiving, from the one or more UEs, a request-to-send (RRQ) signal for transmitting the ultra-reliable QoS traffic, wherein the code for relaying relays the ultra-reliable QoS traffic based at least in part on comparing a sequence identifier received in the RRQ to a selected sequence identifier selected by the relaying UE for transmitting over the time duration.

* * * * *